June 8, 1926.
C. R. CONKLIN
1,588,310
BOLT AND NUT LOCK
Filed Nov. 10, 1925
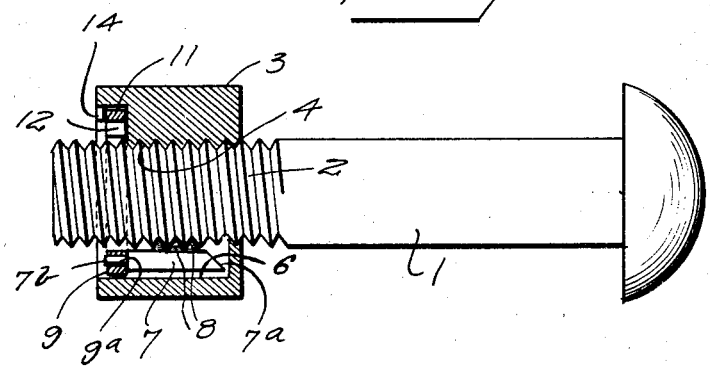
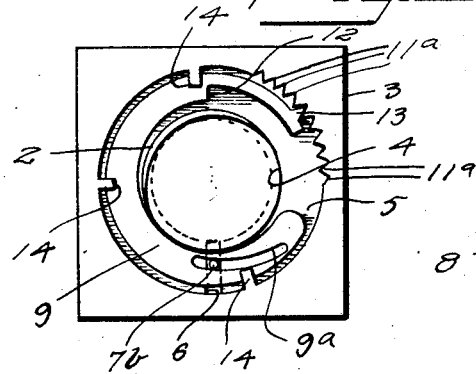
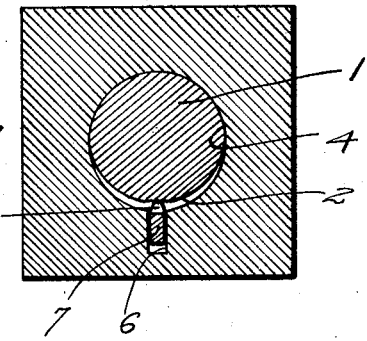
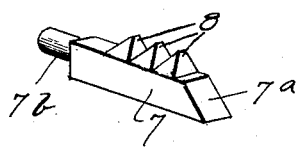
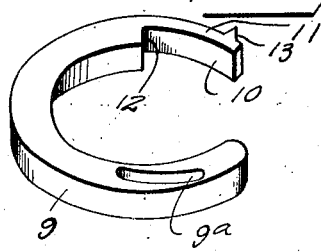
INVENTOR.
C. R. Conklin
BY
ATTORNEY.

Patented June 8, 1926.

1,588,310

UNITED STATES PATENT OFFICE.

CHARLES R. CONKLIN, OF SPRINGFIELD, MISSOURI, ASSIGNOR OF FORTY-EIGHT ONE-HUNDREDTHS TO ANDREW JACKSON CONKLIN, OF SPRINGFIELD, MISSOURI.

BOLT AND NUT LOCK.

Application filed November 10, 1925. Serial No. 68,236.

This invention relates to new and useful improvements in bolt and nut locks and more particularly to a lock which positively locks the bolt and nut together.

The primary object of the invention is to provide a device of this character which will overcome the many difficulties now experienced in devices of this type and which will permit of ready application and assurance against disengagement.

A further object of the invention resides in providing a device which combines a locking key with a locking ring or washer for retaining the key in place in engagement with the threads of the bolt, the locking washer or ring being positively engaged with the nut.

A still further object resides in providing a device which is simple and durable in construction, inexpensive to manufacture, and one which will be very efficient in use.

With these and other objects in view, my invention consists in the novel features of construction, combination, and arrangement of parts as will be hereinafter referred to and more particularly pointed out in the specification and claims.

In the accompanying drawing forming a part of this application,

Figure 1 is an elevation, partly in section showing my device effectively applied to use, Figure 2 is an end elevation thereof, partly in section, Figure 3 is a transverse sectional view illustrating the device, Figure 4 is a detail perspective view illustrating the locking key, and Figure 5 is a similar view illustrating the locking ring or washer.

In describing the invention, I shall refer to the drawings in which similar reference characters designate corresponding parts throughout the several views and in which 1 designates a bolt of the usual or any preferred character having a threaded portion 2 to which is adapted to be applied the nut 3. In one face of the nut 3 surrounding the opening 4 is an annular seat 5 and a longitudinal slot or key-way 6 is provided in the nut which extends from the bottom wall of the seat approximately to the outer face of the nut.

A locking key 7 is located in the key-way or slot 6 and it is provided with a number of teeth or threaded portions 8 which are of a steeper pitch than the threads of the nut and bolt so that said teeth or threaded portions will bite into the bottom of the threads of the bolt. One end of the locking key 7 is beveled as at $7^a$ and its other end is provided with a reduced stem $7^b$.

A split ring of spring steel is located in the seat 5 and it is provided with an eccentric slot $9^a$ which receives the stem $7^b$ of the key 7. A portion of the inner peripheral edge of the ring 9 is cut away as at 10 to provide an elastic arm 11 and a shoulder 12 on the inner edge of the ring. The free end of this arm is provided at the outer edge of the ring with a tooth 13 which is adapted to enter one of the notches $11^a$ to secure the ring in adjusted positions. The key 7 and ring 9 are secured in position by lugs 14 which are carried by the nut 3 and which engage the outer face of the ring. The key 7 is held in engagement with the threads of the bolt by the stem $7^b$ fitting in the slot $9^a$ of the ring 9.

Owing to the eccentricity of the slot $9^a$ in the ring 9 and as the stem $7^b$ of the key 7 is located in the slot $9^a$, the movement of the ring in one direction will move the key inwardly into bolt engaging or active or locking position. The movement of the ring 9 in the reverse direction will move the key 7 outwardly away from the bolt or into bolt releasing or inactive position. The nut is applied to the bolt when the key 7 is in an inactive position. After the nut has been turned upon the bolt, the ring 9 is moved in the direction to force the key into active or bolt engaging position. This may be done by tapping on the shoulder 12 with a punch or any other suitable instrument. The tooth 13 will by means of its engagement in one of the notches $11^a$ hold the ring against accidental movement.

From this construction as described above, it will be seen that I have provided a device which will be positive in the securing of the nut to a bolt, thereby removing all possibility of the nut being casually or accidentally loosened on the bolt.

It will further be seen that I have provided a simple, inexpensive and efficient means for carrying out the objects of the invention.

Having thus described my invention what I claim is:—

1. In a device of the class described, the combination with a bolt, of a nut having a longitudinal key-way intersecting the threaded portion thereof and provided with an annular seat on its outer face surrounding the opening therein, a locking key adapted for introduction into said key-way, and a locking ring adapted to be positioned in the aforesaid seat and having an eccentric slot to receive the key to secure the key in locking position.

2. In a device of the class described, the combination with a bolt; of a nut provided with a longitudinal key-way intersecting the threads thereof and having an annular seat in its outer face surrounding the opening therein, said seat being also provided with notches at a predetermined point therein, a locking ring adapted to be seated in the aforesaid annular seat, said locking ring being provided with a lug for engagement with any one of the notches, and a key carried by said key-way and operatively connected with said locking ring to be moved thereby into and out of engagement with the bolt threads.

3. In a device of the class described, the combination with a bolt; of a nut having a longitudinal key-way intersecting the threads thereof and also provided with an annular seat in its outer face surrounding the opening therein, said seat being provided with a plurality of notches at a predetermined point therein a locking key adapted to be introduced into said key-way, a split locking ring adapted to be seated in the aforesaid seat of the nut, one end of the ring having an eccentric slot adapted to receive one end of the key, and a lug on said ring for engagement with any one of the notches to bring the key into engagement with the bolt.

In testimony whereof I affix my signature.

CHARLES R. CONKLIN.